United States Patent
Guethaus et al.

(10) Patent No.: US 7,643,454 B2
(45) Date of Patent: Jan. 5, 2010

(54) METHODS OF AVOIDING MULTIPLE DETECTIONS OF RANDOM ACCESS CHANNEL PREAMBLE IN WIRELESS COMMUNICATION SYSTEMS

(75) Inventors: Roland Guethaus, Schwaig (DE); Thomas Kleinhenz, Nuremberg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 908 days.

(21) Appl. No.: 10/861,475

(22) Filed: Jun. 7, 2004

(65) Prior Publication Data

US 2005/0271025 A1    Dec. 8, 2005

(51) Int. Cl.
*H04B 7/216* (2006.01)

(52) U.S. Cl. ...................... 370/335; 455/515

(58) Field of Classification Search .................. 370/335, 370/341, 342, 343, 329, 330
See application file for complete search history.

(56) References Cited

U.S. PATENT DOCUMENTS

2001/0026543 A1* 10/2001 Hwang et al. ................ 370/335

* cited by examiner

*Primary Examiner*—Tu X Nguyen
(74) *Attorney, Agent, or Firm*—Harness, Dickey & Pierce (57) ABSTRACT

In a method of avoiding multiple detection of the same random access channel (RACH) preamble in a wireless communication system, and within a given set of access slots, a given sub-set of available preamble signatures corresponding to a RACH preamble of a user may be detected, so as to avoid multiple RACH preamble detection in a given access slot. Another method may be directed to switching operations of a base station in a communication network. Base station operations may be switched back and forth between multi-sector/single cell operations and single sector/multi-cell operations without changing an existing antenna configuration.

8 Claims, 7 Drawing Sheets

Conventional Art

METHODS OF AVOIDING MULTIPLE DETECTIONS OF RANDOM ACCESS CHANNEL PREAMBLE IN WIRELESS COMMUNICATION SYSTEMS

BACKGROUND OF THE INVENTION

1. Field of the Invention

The present invention is related, in general, to avoiding multiple detection of the same random access channel (RACH) preamble in a wireless communication system.

2. Description of the Related Art

Expanded efforts are underway to support the evolution of the Universal Mobile Telecommunications System (UMTS) standard, which describes a network infrastructure implementing a next generation Wideband Code Division Multiple Access (W-CDMA) air interface technology. A UMTS typically includes a radio access network, referred to as a UMTS terrestrial radio access network (UTRAN). The UTRAN may interface with a variety of separate core networks (CN). The core networks in turn may communicate with other external networks (ISDN/PSDN, etc.) to pass information to and from a plurality of wireless users, or user equipments (UEs), that are served by radio network controllers (RNCs) and base transceiver stations (BTSs, also referred to as Node Bs), within the UTRAN, for example.

Standards related to UMTS have introduced several technologies in an effort to ensure that any associated control and/or data information is carried in an efficient manner, in an effort to improve overall system capacity. One set of issues being addressed by the 3rd Generation Partnership Project (3GPP), a body which drafts technical specifications for the UMTS standard and other cellular technologies, includes considerations related to a start-up phase of a given UMTS network.

During a start-up phase for a UMTS network, there may be only a small number of users. However, it may be desirable for the cost expensive antenna installation to be done a single time, and that an upgrade of the Node-B towards a higher number of supported users be done by hardware alone, upgrading the Node-B itself.

One possible configuration that may facilitate the above is referred to as a 'pseudo omni cell'. A pseudo omni cell employs the conventional three sector configuration of a Node-B, but employs it as a single cell configuration consisting of three sectors, where each sector may represent a geographical area that is covered by an antenna of a Node B. This concept is referred to as Multiple Receive Pseudo Omni (MRPO). With increasing numbers of UEs, the Node-B may be up-graded from a 3-sector/1-cell configuration to a 1-sector/3-cell configuration without expensive changing of the deployed antenna configuration.

However, the above approach may pose certain problems, particularly with regard to detection of random access channels (RACHs) which are transport channels carrying data mapped from upper level logical channels (OSI Layers 3-7). The RACH transport channels may then be sent by the UE in the uplink to the Node B over physical channels such as a physical RACH (PRACH).

In general, physical channels are defined by a specific carrier frequency, scrambling code, channelization code (optional), time start & stop (giving a duration) and, on the uplink, relative phase (0 or $\pi/2$). Time durations may be defined by start and stop instants, measured in integer multiples of chips. Suitable multiples of chips may be based on a radio frame, slot and/or sub-frame configuration. A radio frame is a processing duration which consists of 15 slots. The length of a radio frame corresponds to 38400 chips. A slot is a duration which consists of fields containing bits. The length of a slot corresponds to 2560 chips.

The default time duration for a physical channel may be continuous from the instant when it is started to the instant when it is stopped. Transport channels may be characterized as being capable of being mapped to physical channels. Within the physical layer itself, the exact mapping may be from a composite coded transport channel (CCTrCH) to the data part of a physical channel. In addition to data parts there also exist channel control parts and physical signals.

To understand the potential problems with RACH detection in an MRPO sector-cell configuration of a communication network such as a UMTS network, aspects of the conventional RACH structure and operation are described in further detail below.

As discussed above, the PRACH is used to carry the RACH, where the RACH is an uplink transport channel intended to be used to carry control information from the user equipment (UE), such as requests to set-up a connection, as part of a random-access transmission in the uplink from a UE to a Node B, for example. The RACH may also be used to send small amounts of packet data from the UE to the network.

The random-access transmission is based on what is referred to as a Slotted ALOHA approach with fast acquisition indication. A UE can start the random-access transmission at the beginning of a number of given time intervals, which are referred to as 'access slots'. There are 15 access slots per two frames, typically one frame of 8 slots and a second frame of seven slots, and are spaced 5120 chips apart, as specified in 3GPP TS 25.211, V6.0.0 (2003-12), entitled "Physical channels and mapping of transport channels onto physical channels (FDD)". The timing of the access slots and the acquisition indication is described in TS 25.211, section 7.3. Information on what access slots are available for random-access transmission may be given by higher layers (i.e., OSI layers 3-7). A UE sends a series of PRACH preambles. A PRACH preamble is may be answered by the Node B using an Acquisition Indication Channel (AICH) in the downlink. The Node sends either a ACK or a NACK back to the mobile. If a ACK is received by the mobile it starts the transmission of the RACH message.

For proper system operation, the random-access transmission (e.g., the RACH message) should be able to be received from the entire desired cell coverage area. The AICH is a fixed rate (SF=256) physical channel used to carry Acquisition Indicators (AI), where $AI_s$ corresponds to signature s on the PRACH. The AICH consists of a repeated sequence of 15 consecutive access slots, each of length 5120 chips. Each access slot consists of two parts, an AI part consisting of 32 real-valued signals $a_0, \ldots, a_{31}$, and a part of duration 1024 chips with no transmission that is not formally part of the AICH. Thus, in order to support data transfer in the uplink and downlink directions, the RACH transport channel utilizes two physical channels, the PRACH in the uplink and the AICH in the downlink. The AICH uses a reserved OVSF channelization code to indicate this. The code number is indicated to the UE with the system information on BCH. The AICH uses the downlink primary scrambling code of the cell.

A PRACH may be described by the following attributes: Preamble Scrambling Code, Preamble Signatures, Sub-channels and Uplink Message Channelization Code. The random-access transmission consists of one or several preambles of length 4096 chips and a message of length 10 ms or 20 ms.

There are a total 8192 PRACH preamble scrambling codes. These codes are divided into 512 groups with 16 codes in each group. The RNC uses Radio Resource Control (RRC) System Information Broadcast message numbers 5 and 6 to broadcast the actual used PRACH scrambling code group. There may be a one-to-one mapping between the group of PRACH preamble scrambling codes in a cell and the primary scrambling code used in the downlink of a cell, as shown in expression (1) below:

PRACH Preamble Scrambling Code=16*Downlink Scrambling Code+PRACH Scrambling Code Group     (1)

There are a total of 512 downlink scrambling codes available for one cell. The code that is used may be determined by the UE during a cell search procedure. The relationship between the downlink and the uplink scrambling codes is such that the same code allocation scheme may be applied on both the downlink and uplink.

As noted above, the PRACH preamble consists of 4096 chips, which is a sequence of 256 repetitions of Hadamard codes of length 16. The preamble is scrambled with a scrambling code. All 16 Hadamard codes can be used for random access. The RNC uses the RRC System Information Broadcast messages numbers 5 and 6 to broadcast the "PRACH system information list", providing the actual used PRACH preamble signatures and the access slots that are used by UEs in a given cell. The Hadamard codes may be referred to as signature of the preamble or "preamble signature". Because of its orthogonality, several access attempts with different preamble signatures may be simultaneously detected.

Uplink channelization codes of the RACH message are derived as follows. Each of the 16 available preamble signatures points to one of the 16 nodes in the Orthogonal Variable Spreading Factor (OVSF) code-tree that correspond to channelization codes of length 16. The sub-tree below the specified node is used for spreading of the message part.

A RACH sub-channel defines a sub-set of the total set of uplink access slots. There are a total of 12 RACH sub-channels (sub-channels 0-11), which describe the access of the following uplink access slots, shown in Table 1 below:

TABLE 1

Available uplink slots for different RACH sub-channels

| SFN mod 8 of corresponding P-CCPCH frame | Sub-channel number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

Referring to Table 1, there is shown 12 RACH sub-channels (0-11). Additionally, there is shown 15 access slots (0-14) per two frames (System Frame Numbers (SFNs)). Each row indicates which access slots are in which frame, each column indicates what access slots are for each sub-channel.

For example, access slots 0-14 are provided across SFNs 0 and 1, 2 and 3, etc. The understand Table 1, each sub-channel is assigned specific access slots in a given frame. Thus for example, the access slot for sub-channel 1 in frame 0 is access slot 1. Sub-channel 2 is assigned access slots 2, 14, 11, 8 and 5 over the 8 SFNs. A UE may use any access slot that is available based on the broadcast received from the RNC, and may use any preamble signature indicated available by the broadcast.

Figure 1:
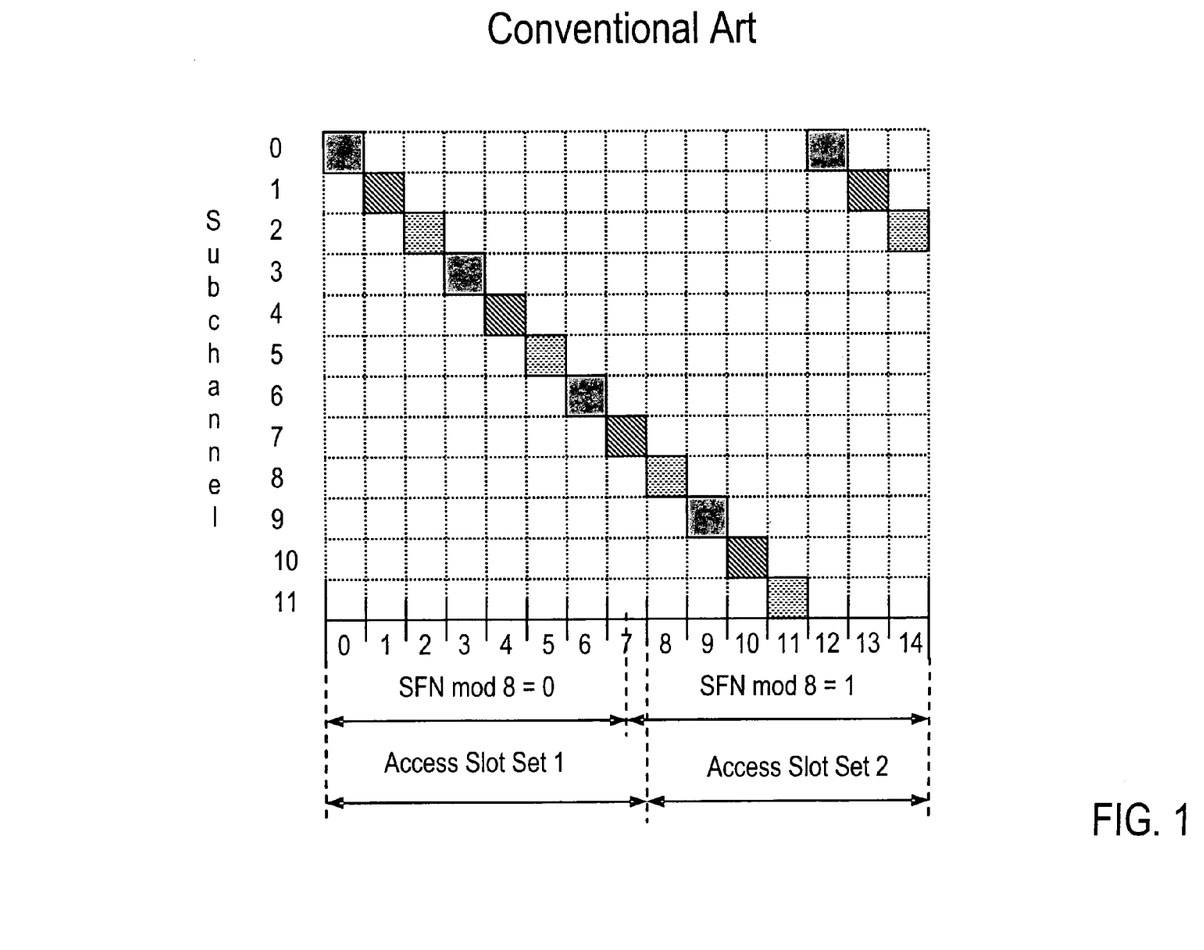
FIG. 1 illustrates a conventional periodic sub-channel structure for a RACH.

FIG. 1 illustrates a conventional periodic sub-channel structure for a RACH. FIG. 1 should be viewed with occasional reference to Table 1. As shown in FIG. 1, there is a periodic structure for the RACH sub-channel. The left-handle side (Y-axis) illustrates the sub-channels, and the x-axis illustrates the two frames containing the 15 access slots (slots 0-14) as discussed with respect to Table 1, here shown as SFN 0 (8 access slots) and SFN 1 (7 access slots).

For RACH timing, a preamble-to-preamble distance may depend on a AICH transmission timing parameter. This parameter may be assigned by the RNC RRC layer and is broadcast to the in the system information block 5. The minimum preamble-to-preamble distance may be three (3) access slots (if the AICH transmission timing parameter is set to 0), or four (4) access slots if the AICH transmission timing parameter is set to 1.

If the Node B detects a RACH preamble in an RACH access slot with a certain signature, it echoes this signature in the associated AICH access slot multiplied with an AI. The AI is used to indicate, to the UE, that its RACH access request has been accepted (or not).

The PRACH resources (i.e., access slots and preamble signatures) may be divided between different Access Service Classes (ASCs) in order to provide different priorities of RACH usage. In the case where multiple PRACHs use the same PRACH preamble scrambling code, the available preamble signatures per PRACH should be disjunct, i.e., each PRACH should be using a set of preambles which are not used by the other PRACH. For a multiple PRACH per cell configuration with different PRACH preamble scrambling codes, no special cell configuration is necessary, except that suitable ASC usage and RACH partitioning should be employed.

Figure 2:
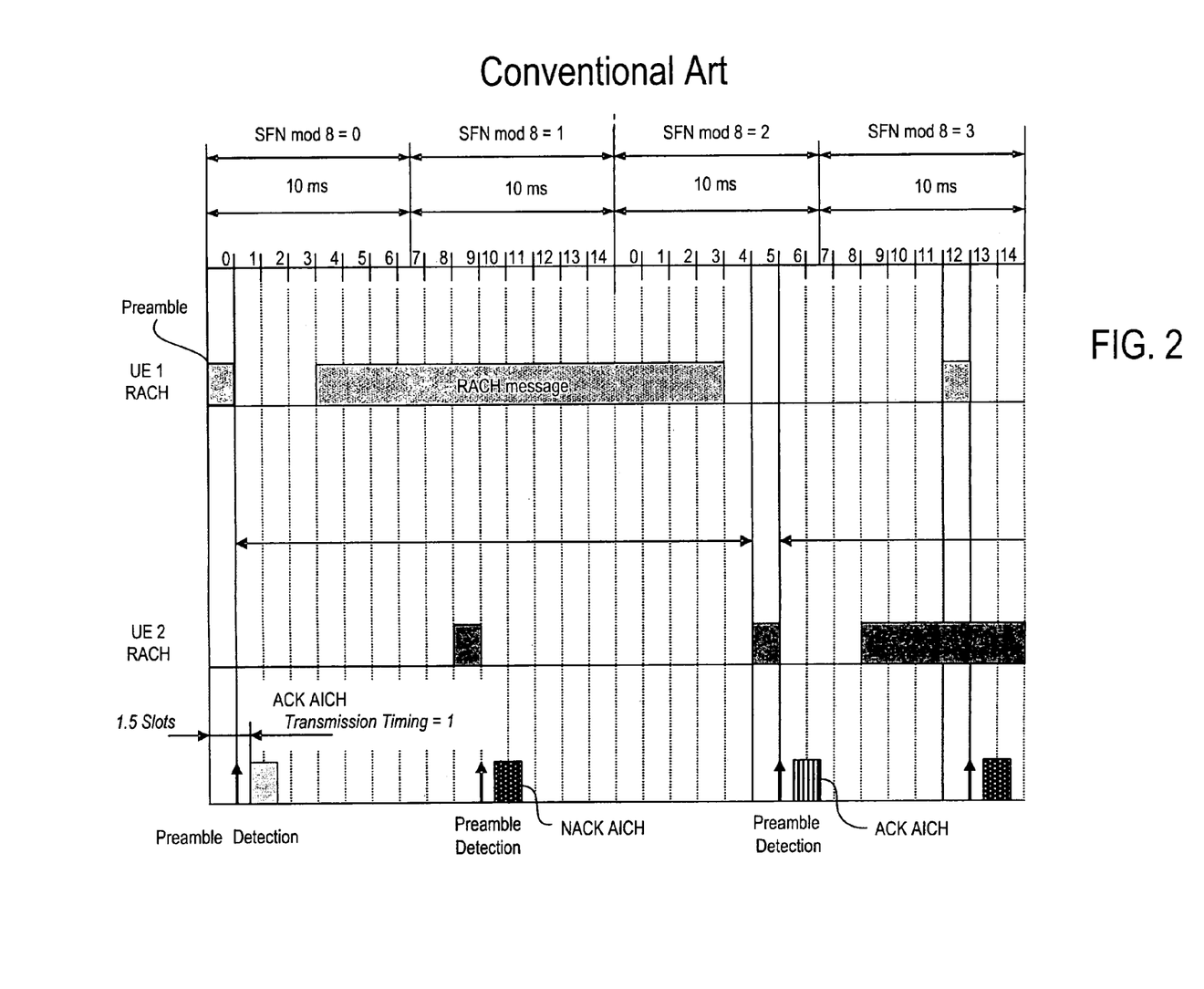
FIG. 2 illustrates a timing diagram of a conventional channel element for RACH preamble detection.

FIG. 2 illustrates a timing diagram of a conventional channel element for RACH preamble detection. A baseband unit (BBU) is a device that can process several transport/physical channels in parallel. A channel element (CE) may be understood as the functional unit or device for handling a single transport/physical channel. A BBU may have multiple CEs. A BBU may be an element or device of a base station such as a Node B.

Referring to FIG. 2, there is shown a preamble part and a message part for a RACH for two UEs, UE1 and UE2 across four (4) SFNs. A CE of a Node B in a given cell (such as for UE1) looks for the preamble, here shown in slot 0 of SFN 0.

In general, if the CE detects the preamble, the CE determines whether it understands the preamble signature of the preamble. If the preamble signature is understood, the CE then determines whether it has an available message demodulator with free capacity (i.e., a demodulator or receiver that has no on-going reception) and if so, the CE prepares the demodulator with the appropriate channelization code according to the signature and sends a positive message (ACK) on an AICH to UE1. Based on receiving the ACK on the AICH, UE1 transmits the message part of the RACH to the CE, which forwards the request to the controlling RNC in the UTRAN, for example such hat the RNC may allocate a channel for the call.

Thus, the CE has a single RACH preamble detector. The RACH preamble detector is configured with the PRACH scrambling code and the set of allowed preamble signatures. The CE may further include a message demodulator as discussed above (not shown) for the PRACH and an AI generator (not shown). The CE preamble detector is able to detect preambles of up to 16 signatures.

Conventionally, the CE selects the strongest received preamble and sends for its signature a positive AI (ACK AICH) if the message demodulator is idle, or a negative AI (NACK AICH), if the message demodulator is busy. Per each access slot one or more AI may be sent. A UE might not get an AI with their signature in response to a sent preamble. These UEs may retry the access and send another preamble in the next possible access slot with a new signature.

As discussed above, the basic concept for Multiple Receive Pseudo Omni (MRPO) is that the RNC views a 3-sectorized Node-B as an omni-cell Node-B. One logical cell and one set of common channels are created by the RNC via the Node B Application Part (NBAP), which is a control plane protocol used at the luB interface to carry signaling traffic to manage the logical resources at the Node B. In the uplink, the signals of the three sectors have to be combined in the CE.

Figure 3:
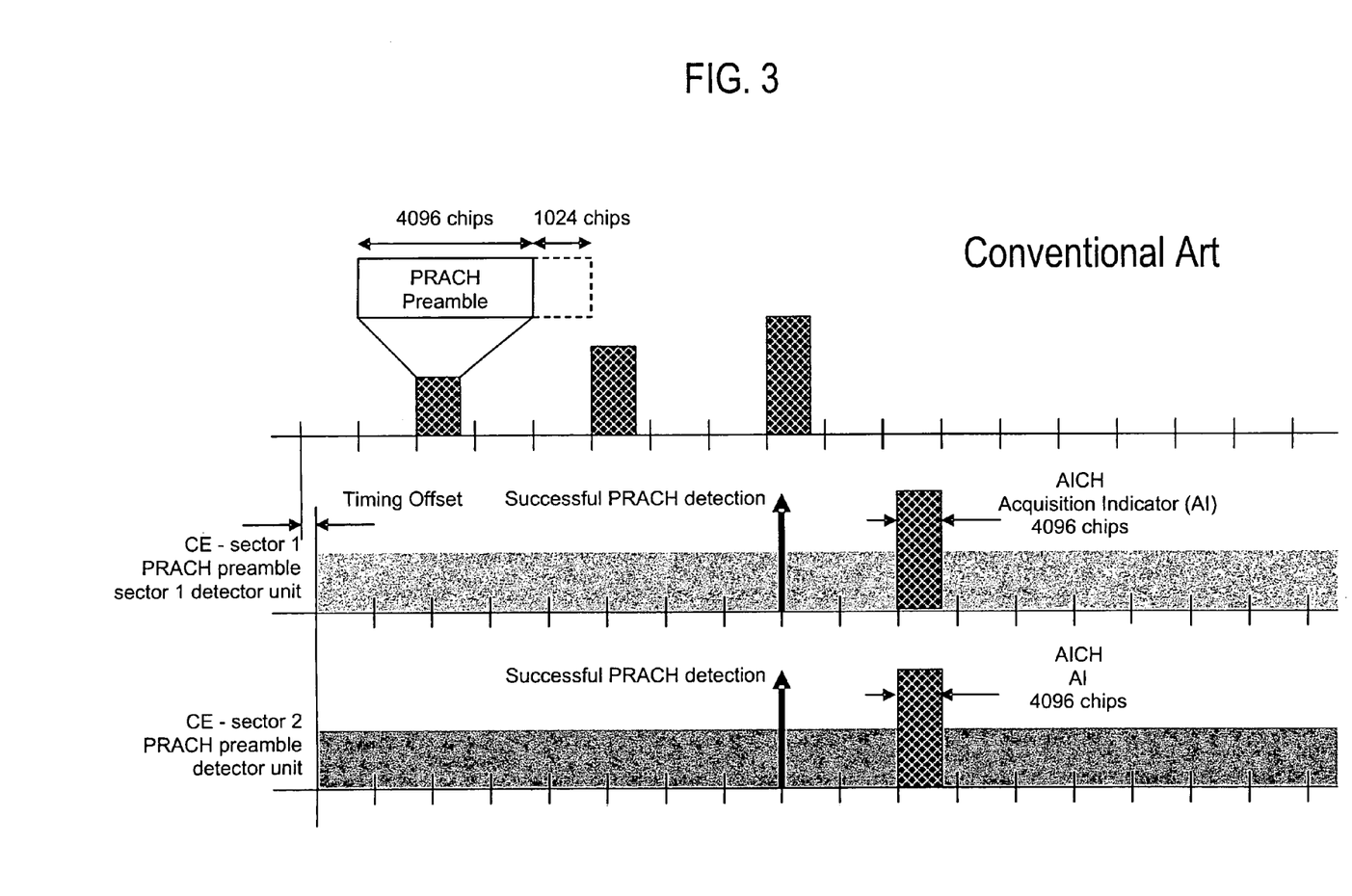
FIG. 3 illustrates multiple PRACH detection by a conventional detection process.

As mentioned above, only one preamble detector is included in a given CE. In other words, one CE is necessary to detect the RACH of one sector. In MRPO, however, there is a multi-sector cell with several preamble detectors, each dedicated to one sector. Although each CE may look in all sectors and may perform maximum ratio combining, each given CE only considers the RACH messages for its configured sector FIG. 3 illustrates multiple PRACH detection by a conventional detection process. In a MRPO configuration, it may be possible (due to multi-path propagation, for example) that one PRACH sent by a UE is successfully received in two (or more) sectors by two (or more) CEs. This is shown in FIG. 3. If no precautions are taken, one RACH message detected by multiple CEs and acknowledged individually (by sending an AICH message such as ACK AICH). Furthermore, the received RACH message may be sent by multiple CEs as an independent RACH message towards the RNC, which may pose certain problems.

For example, when several independent RACH messages are transmitted in a PRACH by the corresponding UEs to the network, call-rate related statistics may be worsened. For example, a message from a UE may be received in two separate sectors by two CE's of a Node B which are not in communication with each other. If both CEs detect a RACH preamble from the same UE and inform the controlling RNC (e.g., multiple RACH detection), the RNC may attempt to set-up multiple calls to the UE. However, only one set-up will be successful, the other set-up thus times out. Accordingly, the RNC unnecessarily allocates resources (i.e., 2 channels) when one channel allocation is necessary. Thus statistics such as those which count the number of call drops may increase.

Additionally, and depending on the demodulation loading in each CE, a negative AICH (NACK AICH) could be sent from one CE, and a positive AICH (ACK AICH) could be sent from another CE. This may confuse the UE. Further, if two AICHs are sent to the UE, the received AICH power will be doubled. This may cause the UE to compute an incorrect AICH-to-CPICH power ratio. Accordingly, the conventional processes for parallel RACH detection may not be suitable for an MRPO network configuration.

SUMMARY OF THE INVENTION

Exemplary embodiments of the present invention, in general, are directed to methods of avoiding multiple detection of the same random access channel (RACH) preamble in a wireless communication system. In an exemplary embodiment, and within a given set of access slots, a given sub-set of available preamble signatures corresponding to a RACH preamble of a user may be detected, so as to avoid multiple RACH preamble detection in a given access slot.

Another exemplary embodiment of the present invention is directed to a method of switching operations of a base station in a communication network. Operations may be switched back and forth between multi-sector/single cell operations and single sector/multi-cell operations without changing an existing antenna configuration.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus do not limit the exemplary embodiments of the present invention.

DETAILED DESCRIPTION OF THE EXEMPLARY EMBODIMENTS

Although the following description of the present invention is based on the Universal Mobile Telecommunications System (UMTS) network infrastructure implementing a next generation Wideband Code Division Multiple Access (W-CDMA) air interface technology, it should be noted that the exemplary embodiments shown and described herein are meant to be illustrative only and not limiting in any way. As such, various modifications will be apparent to those skilled in the art. For example, it will be understood that the present invention finds application to any medium access control protocol with multiple modes in other spread spectrum systems such as CDMA2000 systems, other 3G systems and/or potentially developing fourth generation (4G) wireless communication systems.

Where used below, base transceiver station (BTS) and Node-B are synonymous and may describe equipment that provides data connectivity between a packet switched data network (PSDN) such as the Internet, and one or more mobile stations. Additionally where used below, the terms user, user equipment (UE), subscriber, mobile station and remote station are synonymous and describe a remote user of wireless resources in a wireless communication network. Further, the term 'preamble' refers to a RACH preamble, and the term 'preamble signature' refers to a RACH preamble signature (channelization codes) for a RACH message carried by a PRACH, where the preamble signature is embodied as a sequence of 256 repetitions of Hadamard codes of length 16.

Figure 4:
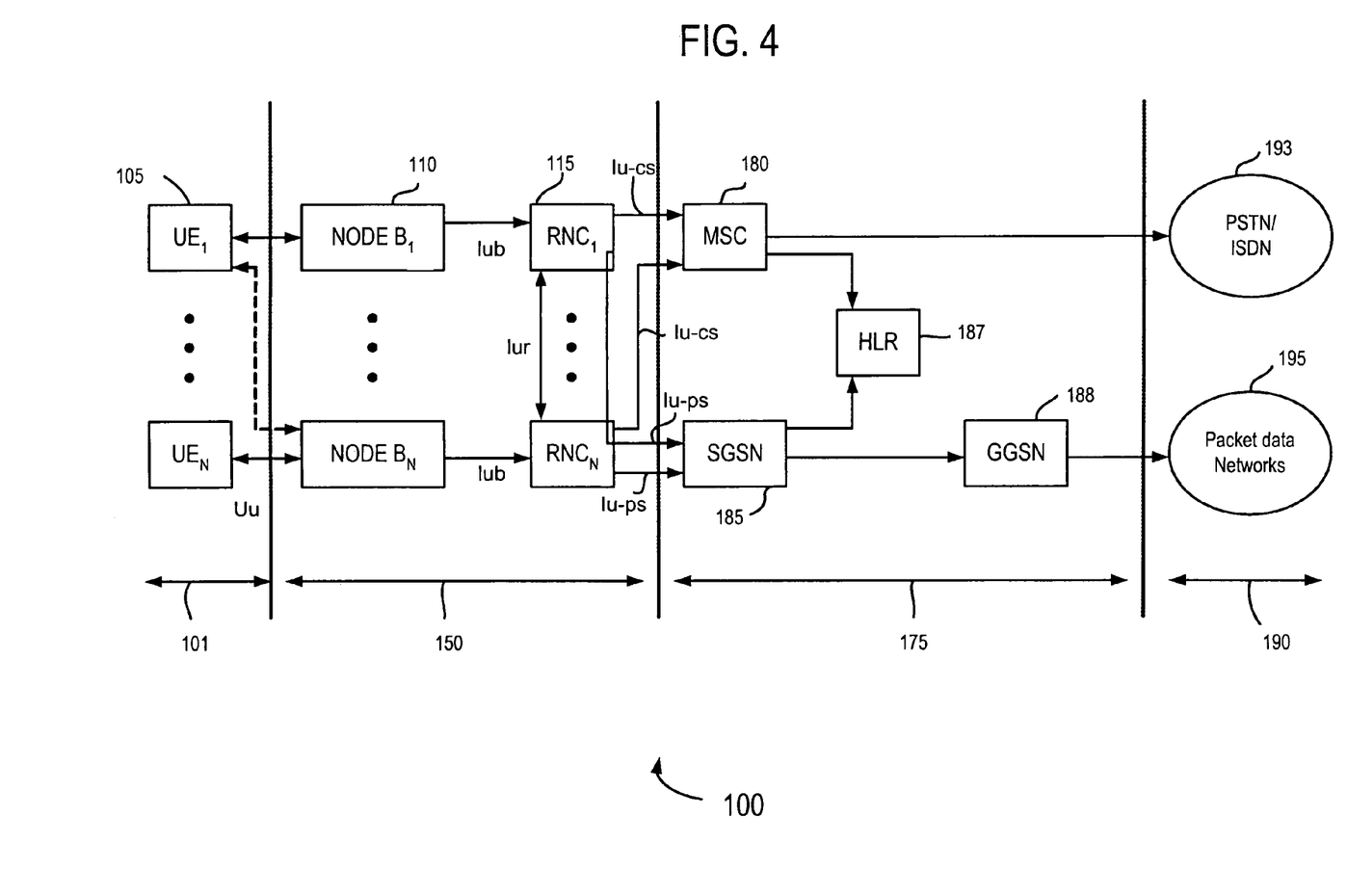
FIG. 4 illustrates a high-level diagram of the UMTS architecture, in accordance with an exemplary embodiment of the invention.

FIG. 4 illustrates a high-level diagram of the UMTS architecture, in accordance with an exemplary embodiment of the invention. Referring to FIG. 4, a UMTS architecture 100 comprises a radio access network part that may be referred to as a UMTS terrestrial radio access network (UTRAN) 150.

The UTRAN 150 interfaces over a Uu air interface with a radio interface part 101; namely user equipments (UEs) such as mobile stations. The Uu air interface is the radio interface between the UTRAN 150 and one or more UEs 105. The UTRAN 150 also interfaces with one or more core networks (CNs) 175 (only one being shown in FIG. 4 for simplicity) via interfaces Iu-cs and Iu-ps, for example. Iu-cs, short for Interface Unit (Circuit Switched) interface, is the interface in UMTS which links the RNC with a Mobile Switching Center (MSC). Iu-ps, short for Interface Unit (Packet Switched) interface, is the interface in UMTS which links the RNC with a Serving GPRS Support Node (SGSN). The Uu air interface enables interconnection of Node Bs with UEs, for example.

CN 175 may include mobile switching centers (MSCs) 180, SGSNs 185 and Gateway GPRS serving/support nodes (GGSNs) 188. SGSN 185 and GGSN 188 are gateways to external networks 190. In general in UMTS, SGSNs and GGSNs exchange packets with mobile stations over the UTRAN, and also exchange packets with other internet protocol (IP) networks, referred to herein as "packet data networks". External networks 190 may include various circuit networks 193 such as a packet Switched Telephone Network (PSTN) or Integrated Service Digital Network (ISDN) and packet data networks 195. UTRAN 150 may also be linked to the CN 175 via back-haul facilities (not shown) such as T1/E1, STM-x, etc., for example.

The UTRAN 150 may include cell sites, called Node Bs 110, which may serve a group of UEs 105, generally using a Uu interface protocol. A Node B 110 may contain radio transceivers that communicate using Iub protocol with radio network controllers (RNCs) 115 in UTRAN 150. RNCs 115 within UTRAN 150 may communicate with each other using an Iur protocol, for example. The Iur interface is a subset of the Iu interface that enables interconnection of RNCs with each other. Several Node Bs 110 may interface with a single RNC 115 where, in additional to call setup and control activity, tasks such as radio resource management and frame selection in soft handoff may be carried out. Node Bs 110 and RNCs 115 may be connected via links that use ATM-based packet transport, for example.

The exemplary embodiments are directed, in general, to methods related to avoiding the problems associated with multiple and/or parallel RACH detection, and to methods of arranging channel elements for detecting RACH preambles in a multi-sector cell configuration such as an MPRO configuration. The exemplary methodologies described hereafter are provided in an effort to overcome problems related to placing multiple PRACHs on a single CE, problems related to CE capacity and problems with multiple RACH detection.

In general in an exemplary embodiment, preamble detection by CEs of a Node B may utilize time-multiplex principles in an effort to avoid a situation where one access slot has only one active CE preamble detector. CE preamble detection may be configured to detect only a given sub-set of all available preamble signatures in a given set of access slots. This ensures that, in a given access slot, only one dedicated preamble signature is detected by a given CE. As will be explained further below, such an approach may prevent an uplink RACH message collision with the same channelization code.

Figure 5:
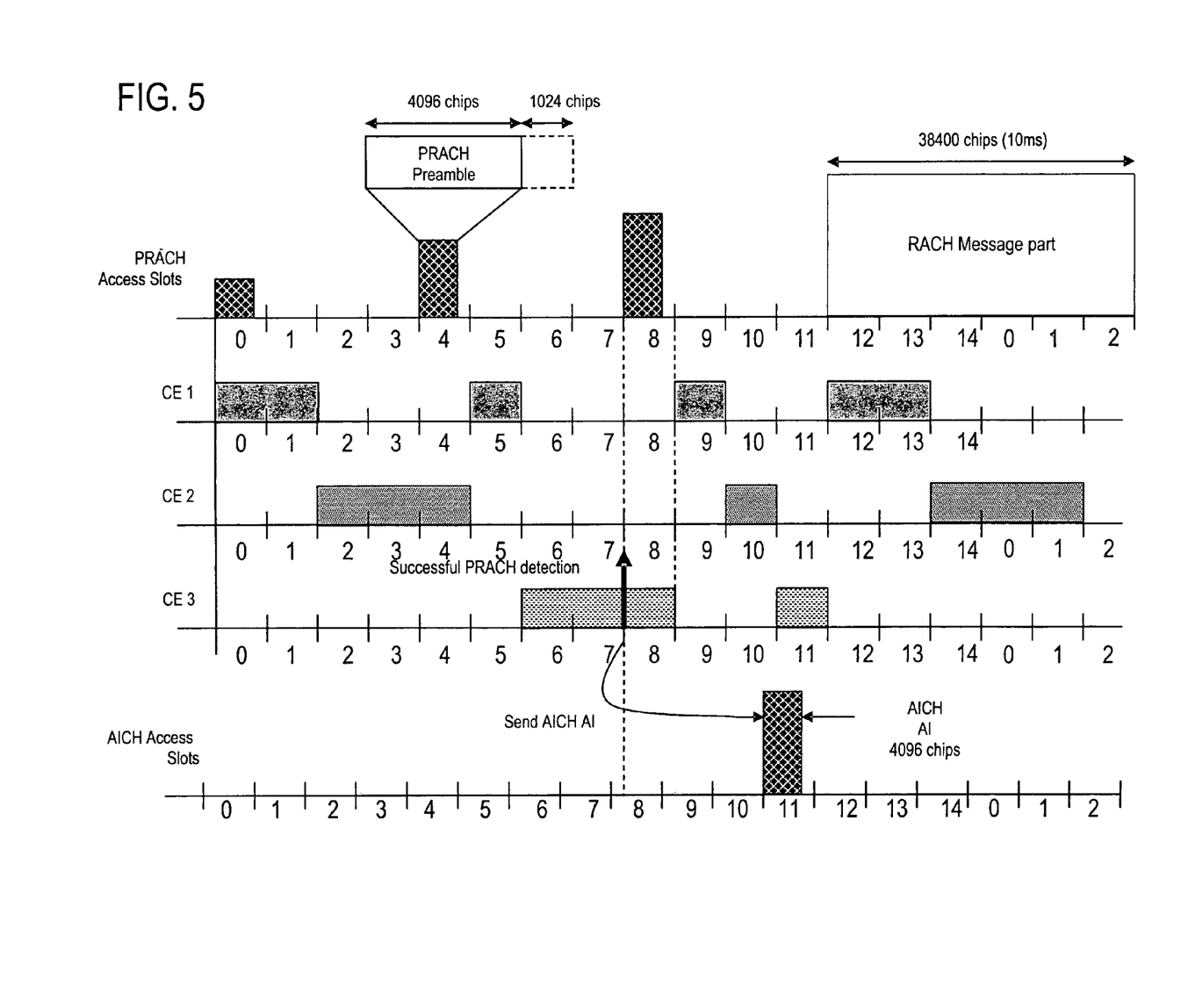
FIG. 5 is a timing diagram for illustrating RACH detection in accordance with the exemplary embodiments of the present invention.

FIG. 5 is a timing diagram for illustrating RACH detection in accordance with an exemplary embodiment of the present invention. As noted above, a RACH sub-channel may define a sub-set of the total set of uplink access slots. In an example, each CE may be configured with a given number of sub-channels. In other words, each CE may be configured so as to only detect a subset of the 12 RACH sub-channels, as shown in FIG. 5.

Referring to FIG. 5, each CE (CE1, CE2 and CE3) are assigned certain access slots in which the designated CE is to monitor so as to look for a given set of preamble signatures of a user. For example, CE 1 looks for active sets of signatures in slots 0, 1, 5, 9, 12 and 13 (and ignores (i.e., does not listen in any other slots); CE 2 only listens in slots 2, 3, 4, 10 and 14, and CE 3 only listens for active sets of signatures in slots 6-8 and 11. Thus, over 2 SFNs, all slots 0-14 are monitored by CEs 1-3.

In FIG. 5 a UE transmits a RACH preamble with increasing power on the PRACH. In this example, CE 3 eventually detects the third RACH preamble at the beginning of slot 8, and the Node B sends an AICH ACK in slot 11 using the same preamble signature (channelization codes) to let the UE know that its preamble was received satisfactory. Accordingly, the message part of the RACH is sent by the UE in slot 12 in the uplink, for decoding by the Node B.

Accordingly, and unlike the conventional art where only one CE is looking into a cell, here at least three (or more) CEs are looking into a given cell, monitoring only designated access slots for designated signature sets. This may be done by assigning each CE a subset of the 12 sub-channels of the RACH, so that only one CE, at one time, may inform the RNC of a RACH message reception from the same UE. This may enable the RNC to avoid allocating multiple channels for a single given user, thereby avoiding wastage in network resources. Further, by arranging the CE's as described above in a given cell, the Node B may be able to accurately detect the RACH of a given UE, regardless of what sector the UE is in.

Figure 6:
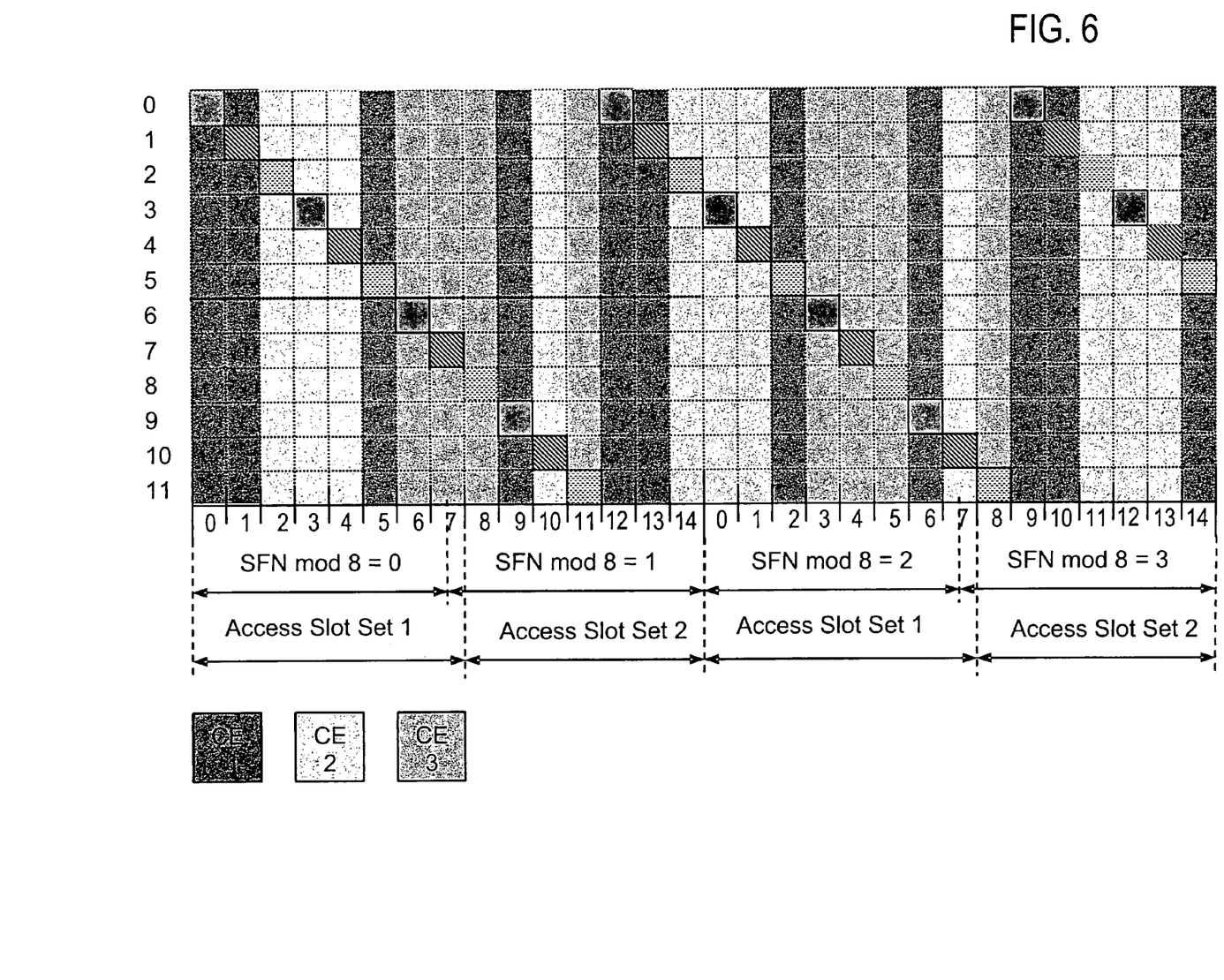
FIG. 6 illustrates as a RACH sub-channel allocation per CE in accordance with the exemplary embodiment of the present invention.

FIG. 6 illustrates a RACH sub-channel allocation per CE in accordance with an exemplary embodiment of the present invention. Referring to FIG. 6, the RACH sub-channel arrangement has a periodic structure. For example, the RACH sub-channel numbers {0-3-6-9} may use the same uplink access slots. Therefore, if a given CE is only configured with these RACH sub-channel numbers, then the CE will never detect a UE, which is using, for example, the RACH sub-channel 1. Similarly, the RACH sub-channels {1-4-7-10} and {2-5-8-11} each respectively use the same uplink access slots.

Based on the periodic RACH sub-channel structure shown in FIG. 6, a given CE may avoid looking into sub-channels which are only a different permutation of the same uplink access slot scheme. In other words, each CE may be configured with a RACH sub-channel from each of the three RACH sub-channels groups: channels {0-3-6-9}, channels {1-4-7-10}, and channels {2-5-8-11}. In the case where a given CE is only configured once during an initialization phase, the following exemplary static RACH sub-channel allocation per CE may be given, as shown in Table 2:

TABLE 2

| | RACH Sub-channel Number |
|---|---|
| CE 1 | 0-1-5-9 |
| CE 2 | 2-3-4-10 |
| CE 3 | 6-7-8-11 |

Table 2 in conjunction with FIG. 6 further illustrate the use of time multiplex principles for RACH preamble detection. Referring to Table 2 and FIG. 6, it can be seen that CE 1 is configured with RACH sub-channels 0, 1, 5 and 9. Although only 4 SFNs are shown for reasons of brevity, and using CE1 in FIG. 6 as an example, CE1 will listen in access slots 0, 12, 9, 6 and 3 (in that order, 6 and 3 not shown) over 8 SFNs for sub-channel 0; slots 1, 13, 10, 7 and 4 (7 and 4 not shown) for sub-channel 1; slots 5, 2, 14, 11 and 8 for sub-channel 5; and slots 9, 6, 3, 0 and 12 (0 and 12 not shown) for sub-channel 9. Thus, over 8 SFNs, CE 1 will have listened in each access slot 0-14. FIG. 6 illustrates a comparison of the CE sub-channel detection to the sub-channel access slot arrangement. In FIG. 6, it can be seen that for a certain sub-channel usage of a UE, all CEs (here shown as CE1-CE 3, although a Node B could be configured with fewer are greater than three CEs) listen over some given time duration in the access slot used by the UE.

Accordingly, in FIG. 6, CE1, CE2 and CE3 may be configured to detect only a certain given subset of the available RACH sub-channels. For example, one exemplary condition may be that at least three (3) RACH sub-channels for each Access Service Class (ASC) are allocated for a given (MRPO) cell, and used by the UE for the physical random access procedure. An ASC is a mechanism related to the group and/or structure of the RACH, so that certain sub-channels are given differently to certain UE's based on the ASC. For example, based on the priority of information, some UE's may need more sub-channels (such as 9) due to a higher ASC for the high priority information. Other UEs may be in a much lower ASC (say needing only 3 sub-channels for lower priority information). Each ASC should be allocated at least one sub-channel for monitoring, but in an MRPO configuration, sub-channels are allocated in multiples of three to a ASC. The sub-channels for an ASC shall be selected from all CE sub-channel configurations. The selection may be chosen with equal probability.

If only the RACH preamble portion of the RACH message is considered, use of the sub-channels overcomes the multiple RACH detection problem. However, the uplink channelization codes of the RACH message should also be considered.

Figure 7:
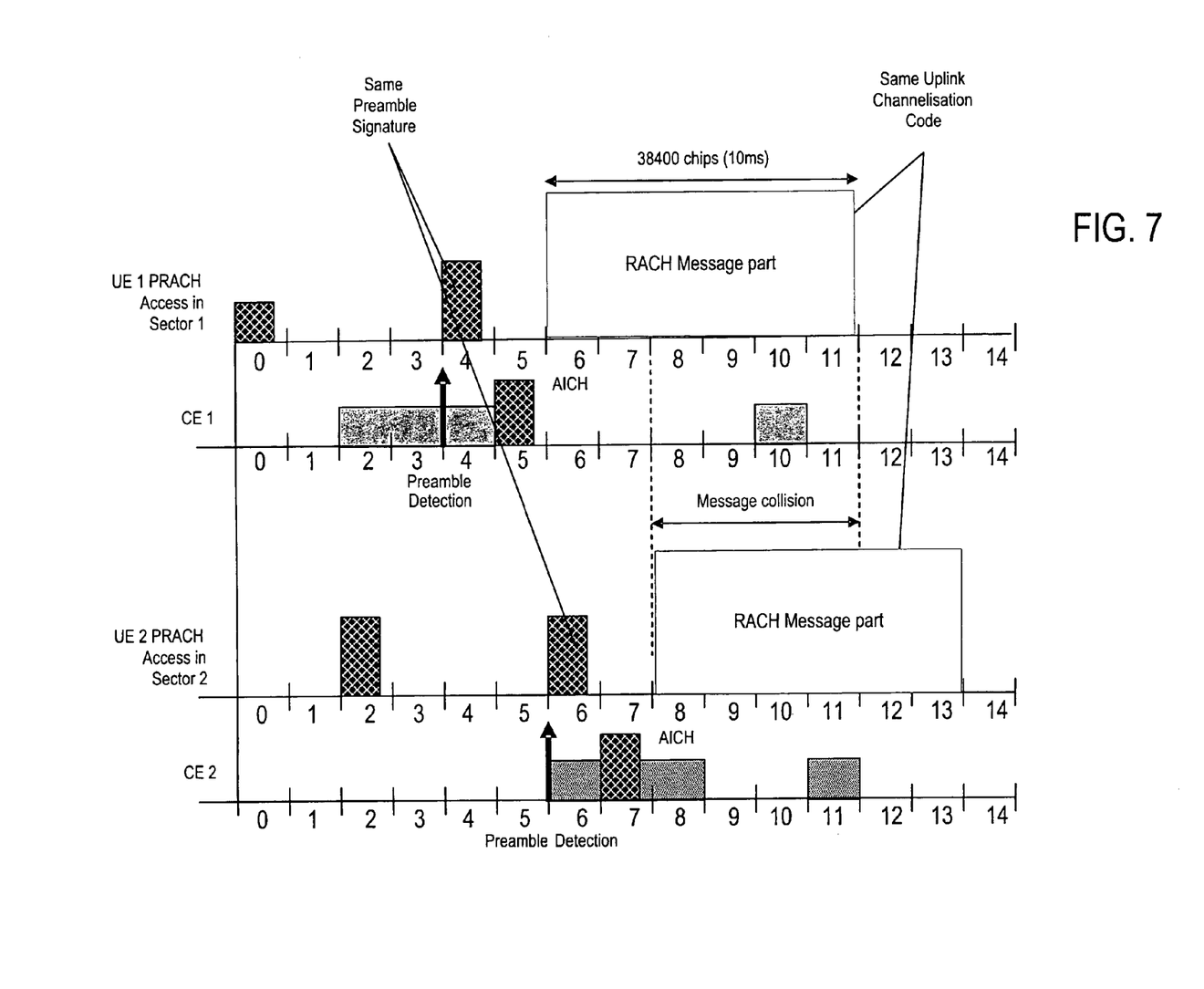
FIG. 7 illustrates a potential PRACH message collision.

FIG. 7 illustrates a potential PRACH message collision. Even if the CEs are allocated with a suitable sub-channel detection scheme using a time-multiplex approach as described in FIGS. 5 and 6, in an effort to avoid multiple detection of the same RACH preamble, it still may be possible that two UEs may simultaneously use the same RACH preamble signature for its respective RACH access request. Because these preamble signatures point to the same node in the OVSF code-tree, there could be a collision of the two RACH messages with the same channelization code, as shown in FIG. 7.

Referring to FIG. 7, if two RACH messages with the same channelization code collide, the message detection may be disturbed is possible by the Node-B, i.e. the UE access request may fail. For example, in FIG. 7, UE1 transmits a RACH preamble at increasing powers until the RACH preamble is detected by CE 1 in access slot 4. The Node B then sends an ACK AICH in slot 5 to UE1, and the UE1 sends the message part of the RACH in slot 6

Meanwhile, UE2 sends a preamble having the same signature as the preamble detected by CE1 at slot 4. CE 2 eventually detected the preamble in slot 6, and the Node B sends an ACK AICH in slot 7 to UE2. UE2 then sends the message part of the RACH message in slot 8, which collides (in access slots 8-12) with the message part of the RACH sent by UE1 a few slots earlier. Accordingly, due to the message collision (where channelization codes in each message collide with one another), the Node B cannot detect either message from UE1 or UE2.

In an effort to overcome the channelization code problem, the RACH detection CEs may be configured so as to detect only a dedicated set of RACH preamble signatures in a given dedicated access slot. For MRPO, the RNC (and Network Planning) should ensure that at least as many preambles are configured as there are MRPO sectors for a given cell.

For all ASC's, to ensure that the same RACH detection probability is given, it may be desirable that at least three (3) (or multiples of 3) RACH preamble signatures for each ASC be allocated (by the RNC and/or UMTS network planning for a MRPO cell, and used by the UE for the physical random access procedure. The selection may be chosen with equal probability, for example.

The RACH preambles signatures may be equally distributed over all available CEs of a given Node B. This may help to ensure that, in all sectors of the cell, the same RACH detection probability may be given. A UE may thus randomly select a given preamble signature from the set of available preamble signatures (known based on the broadcast from the RNC to the UE) within a given ASC.

In the case that multiple PRACHs use the same RACH preamble scrambling code, the available preamble signatures per PRACH has to be disjunct (i.e., distinct or separate). In other words, each PRACH may be using a set of preambles that are not being used by the other PRACHs. As compared to the conventional case, for a multiple PRACH per cell configuration with different PRACH preamble scrambling codes, no special cell configuration is necessary, save for confirming that suitable ASC usage and RACH partitioning is employed.

The exemplary methodologies described herein make it possible to overcome the multiple RACH detection problem. The exemplary methodologies allow design of a cost-effective Node-B for MPRO operations. A MRPO Node-B could be used during the start-up phase of a network, i.e. when only a relatively low UE coverage is required. With increasing numbers of UEs, the Node-B may then be up-graded from a 3-sector/1-cell configuration to a 1-sector/3-cell configuration, without expensive changing of the deployed antenna configuration. For example, in the 3-sector/1-cell configuration (such as during the start-up phase of the network), the RNC tells a given Node B that it is serving one cell having three sectors. Upon a decision by the RNC or UMTS network planning the configuration should be changed to accommodate greater numbers of UEs, say to the 1-sector/3-cell configuration, the RNC would then inform the Node B that the Node B is now serving three cells, where each cell is a single sector cell.

The exemplary embodiments of the present invention being thus described, it will be obvious that the same may be varied in many ways. For example, the logical blocks in FIGS. 4-7 may be implemented in hardware and/or software. The hardware/software implementations may include a combination of processor(s) and article(s) of manufacture. The article (s) of manufacture may further include storage media, computer-readable media having code portions thereon that are read by a processor to perform the method, and executable computer program(s). The executable computer program(s) may include instructions to perform the described operations and the method. The computer executable(s) may also be provided as part of externally supplied propagated signals. Such variations are not to be regarded as a departure from the scope of the exemplary embodiments of the present invention, and all such modifications as would be obvious to one skilled in the art are intended to be included within the scope of the following claims.

What is claimed is:

1. A method of avoiding multiple detections of a random access channel (RACH) preamble in a communication system, comprising:

detecting, within a set of access slots, a given sub-set of available preamble signatures corresponding to a RACH preamble of a user so as to avoid multiple detections of the same RACH preamble in a given access slot, the detecting includes,
  listening for a given sub-set of RACH sub-channels which use the same access slot in order to detect the preamble, the detected preamble having a preamble signature of a given user that is using one of the RACH sub-channels in the given sub-set of RACH sub-channels to access the communication system; and
assigning each of a plurality of channel elements at a Node B a sub-set of the set of access slots to monitor by assigning each of the plurality of channel elements a sub-set of the RACH sub-channels to monitor, one of the sub-sets of the RACH sub-channels being the given sub-set of RACH sub-channels and the Node B being configured to switch between multi-sector/single cell operations and single sector/multi-cell operations.

2. The method of claim 1, wherein a given preamble signature is detected with a substantially equal detection probability.

3. The method of claim 1, wherein the communication system is configured to operate with a multi-sector per single cell configuration for users of the system.

4. The method of claim 3, wherein the configuration is a multiple receive pseudo omni (MRPO) configuration.

5. In a wireless communication system, a base station configured to avoid multiple detections of a random access channel (RACH) preamble in accordance with the method of claim 1.

6. In a wireless communication system, a channel element of a base station, the channel element configured to avoid multiple detections of a random access channel (RACH) preamble in accordance with the method of claim 1.

7. The method of claim 1, wherein at least one of the sub-sets of RACH sub-channels includes more than one sub-channel.

8. A method of avoiding a collision, in a given sector of a cell, of two or more random-access messages (RACHs) transmitted in the uplink by users requesting access to a wireless communication system, comprising:
  detecting, within a set of access slots, a given sub-set of available preamble signatures corresponding to a RACH preamble of a user, so as to avoid a collision between channelization codes of two RACH message parts in the uplink, the detecting includes,
    listening for a given sub-set of RACH sub-channels which use the same access slot in order to detect the preamble, the detected preamble having a preamble signature of a given user that is using one of the RACH sub-channels in the given sub-set of RACH sub-channels to access the communication system; and
  assigning each of a set of channel elements at a Node B a sub-set of the set of access slots to monitor by assigning each of the plurality of channel elements a sub-set of the RACH sub-channels to monitor, one of the sub-sets of the RACH sub-channels being the given sub-set of RACH sub-channels and the Node B being configured to switch between multi-sector/single cell operations and single sector/multi-cell operations.

\* \* \* \* \*

UNITED STATES PATENT AND TRADEMARK OFFICE
CERTIFICATE OF CORRECTION

PATENT NO. : 7,643,454 B2 Page 1 of 1
APPLICATION NO. : 10/861475
DATED : January 5, 2010
INVENTOR(S) : Guethaus et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1242 days.

Signed and Sealed this

Twenty-first Day of December, 2010

David J. Kappos
*Director of the United States Patent and Trademark Office*